United States Patent [19]
Jackson et al.

[11] Patent Number: 6,016,118
[45] Date of Patent: *Jan. 18, 2000

[54] REAL TIME INTEGRATION OF A GEOID MODEL INTO SURVEYING ACTIVITIES

[75] Inventors: Michael E. Jackson, Christchurch, New Zealand; Richard Jackson, San Francisco, Calif.

[73] Assignee: Trimble Navigation Limited, Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 09/035,667

[22] Filed: Mar. 5, 1998

[51] Int. Cl.$^7$ .................................................. G01S 5/02
[52] U.S. Cl. ........................ 342/357.06; 342/357.02; 342/357.01; 701/213; 701/214
[58] Field of Search .................. 342/357.01, 357.02, 342/357.06, 352; 701/213, 214; 455/12.1

[56] References Cited

U.S. PATENT DOCUMENTS

| | | | |
|---|---|---|---|
| 4,841,460 | 6/1989 | Dewar et al. | 364/571.02 |
| 4,899,161 | 2/1990 | Morin, Jr. et al. | 342/451 |
| 4,982,504 | 1/1991 | Soderberg et al. | 33/502 |
| 5,030,957 | 7/1991 | Evans | 342/357 |
| 5,077,557 | 12/1991 | Ingensand | 342/52 |
| 5,155,490 | 10/1992 | Spradley, Jr. et al. | 342/357 |
| 5,204,731 | 4/1993 | Tanaka et al. | 356/1 |
| 5,233,357 | 8/1993 | Ingensand | 342/352 |
| 5,293,233 | 3/1994 | Billing et al. | 348/581 |
| 5,321,797 | 6/1994 | Morton | 395/131 |
| 5,357,600 | 10/1994 | Shirman et al. | 395/133 |
| 5,467,290 | 11/1995 | Darland et al. | 364/561 |
| 5,471,218 | 11/1995 | Talbot et al. | 342/357 |
| 5,544,052 | 8/1996 | Fujita et al. | 364/420 |
| 5,614,913 | 3/1997 | Nichols et al. | 342/357 |
| 5,615,114 | 3/1997 | Nordin | 364/420 |
| 5,631,658 | 5/1997 | Gudat et al. | 342/457 |
| 5,644,318 | 7/1997 | Janky et al. | 342/357 |
| 5,703,594 | 12/1997 | Anderson | 342/123 |
| 5,739,785 | 4/1998 | Allison et al. | 342/357 |
| 5,774,826 | 6/1998 | McBride | 701/207 |

OTHER PUBLICATIONS

John P. Snyder, Map Projections–A Working Manual, U.S. Geological survey, Professional Paper No. 1395, U.S. Government Print Office, 1982, pp.

*Primary Examiner*—Thomas H. Tarcza
*Assistant Examiner*—Dao L. Phan
*Attorney, Agent, or Firm*—John F. Schipper

[57] ABSTRACT

Method and apparatus for enhancing the accuracy of the elevation coordinate in a survey that uses GPS survey measurements to determine location coordinates for a plurality of survey locations. An optimal locally-best-fitting plane is combined with a geoid model that represents a local region of the Earth, in order to decrease the inaccuracy associated with an elevation coordinate in the survey to a fraction of a decimeter.

7 Claims, 7 Drawing Sheets

REAL TIME INTEGRATION OF A GEOID MODEL INTO SURVEYING ACTIVITIES

FIELD OF THE INVENTION

This invention relates to surveying of surfaces on and near the Earth.

BACKGROUND OF THE INVENTION

Point and vector positioning, using location determination (LD) systems such as GPS, provide measures of heights above a reference ellipsoid, such as the WGS84 ellipsoid, as a perpendicular distance from the ellipsoid surface. However, surveyors are interested in elevation, which is measured by perpendicular distance from the geoid (a proxy for sea level) above the local datum defined by the surveyor's local control points, which may be location coordinates for locations that have already been surveyed, used for consistency checks.

A body rotating with the Earth experiences the gravitational attraction of the Earth (and other celestial bodies) and a centrifugal force generated by the Earth's rotation about the Earth axis. This produces a gravitational force vector $g(x,y,z)$, which depends upon location coordinates $(x,y,z)$, which may be described as a sum of gravitational field and a centrifugal potential field. This sum defines a set of equipotential surfaces $W(x,y,z)$=constant on which the magnitude of the vector g is constant. Each of these equipotential surfaces is known as a geoid and is discussed in A. Leick, GPS Satellite Surveying, John Wiley & Sons, New York, Second Edition, 1995, pp. 215–232. Because the local gravitational attraction will differ for a location near a mountain range and a location with no topographic relief, a geoid surface is not smooth everywhere and has bumps or undulations.

Current real-time kinematic Global Positioning Systems (GPS) allow the user to determine, in a least-squares calculation, a set of parameters that relate measured or keyed-in WGS84 heights above the ellipsoid to local control elevations (benchmarks). In effect, this approach models the relationship between the local vertical datum and the ellipsoid as an inclined plane with parameters that describe the location and orientation of the best fitting plane.

To determine the precise range from an Earth-based location determination receiver to a satellite, a reference coordinate system is chosen such that the instantaneous location of the satellite and the receiver are expressed in a uniform coordinate system. The Global Positioning System (GPS) utilizes a Cartesian, Earth-centered, Earth-fixed, coordinate system for determining this range. In the GPS system, the positive axis points in the direction of 0° longitude, the positive y-axis points in the direction of 90° East longitude, and the xy-plane defines the Earth's equatorial plane. To transform Cartesian coordinates into the latitude, longitude and height coordinates of the receiver, a physical model of the Earth is adopted. This model is based on an oblate ellipsoid having a semimajor axis length a and a semiminor axis length b, with $b \leq a$. The values for the lengths a and b are chosen to match as closely as possible a mean sea level or geoid surface. One such closely matching ellipsoid is the WGS84 ellipsoid, which has a semimajor axis length a=6378.137 km and a flatness factor $f=1-(b/a)=1/298.257223563$ (Leick, op cit, p. 487). Other closely matching ellipsoids include the NAD27, WGS72 and NAD83 ellipsoids, each with its own ellipsoid parameters. In some instances, a "local" ellipsoid that better matches a local region is used in place of the WGS84 or other global ellipsoid.

Local or global geodetic coordinates are sufficient to define horizontal network coordinates. However, vertical coordinates are traditionally referenced relative to a geoid rather than to an ellipsoid, which by definition has a smooth shape. The shape of the selected geoid, however, is influenced by the mass distribution in the Earth, and by the resulting local gravity gradient or variation. In geographic regions where the distribution of mass is homogeneous and the gravity variation is negligible, the difference between the geoid surface and the ellipsoid surface may be adequately represented by a vertical offset, normal to the ellipsoid surface. In regions where the gravity variation is non-negligible but constant, the difference between the geoid surface and the ellipsoid surface is better represented by a selected vertical offset and selected tilt angles along two orthogonal axes (vertical plane adjustment). However, in regions where the distribution of the Earth's mass is non-homogeneous or where survey measurements are performed over large spatial distances, large fluctuation in the gravity gradients can occur, and the planar model relating height relative to the geoid and the ellipsoid degrades in accuracy. For example, on the plains of Kansas, a planar model might be sufficient for a 100×100 km (kilometer) project area, whereas at the foot of the Rocky Mountains a planar model may provide only a good approximation on a $3 \times 3$ km$^2$ project area, as indicated in FIG. 1. Assuming a tilted plane relationship between the geoid and ellipsoid for zones such as 1, 2, and 3 in FIG. 1 is often sufficient. However, if a survey project spans an entire mountain front, this simple approach is insufficient.

By incorporating a geoid model in real time processing, geoid undulations with large wavelengths (in a range of about 3–100 km, depending on the quality of the model) might be accommodated in a local site calibration. This is particularly important for users working in regions where the geoid shape departs from an ellipsoidal shape over short spatial distances, and for users who need long range real time kinematic (RTK) capability in surveying and mapping products.

What is needed is an approach that combines a geoid model with a vertical plane adjustment and that allows for derivation of orthometric heights from WGS84 or similarly measured or keyed-in locations on small or large project regions in the field in real time. Preferably, the resulting orthometric heights should be accurate to within about 30 cm.

SUMMARY OF THE INVENTION

This invention meets these needs by utilizing a combination of a geoid model, either preselected or user-derived, and a best fitting plane for the vertical adjustment to determine elevation (orthometric height, above the geoid) in real time. This combined adjustment allows for geoid undulations within the project region and provides a best vertical fit for local control, all accomplished in real time in the field rather than in a post-processing mode. Once the parameters are defined, a user can use a forward transformation together with a geoid model to calculate orthometric height for a measured or keyed-in WGS84 location in a real time survey or mapping environment. Similarly, a reverse transformation can be used to calculate a WGS84 ellipsoid height from a given orthometric height and a geoid model.

A vertical transformation according to the invention is defined as follows: (1) upload a set of control location coordinates, including previous elevation measurements $h_{control}$ for benchmarks, into a field survey controller or other field-based computer; (2) upload a published or user-defined geoid grid file into the field survey controller; (3) enter the WGS84 location coordinates for the project control benchmarks, including the height coordinate $H_{ell}$ relative to the ellipsoid, or derive these WGS84 coordinates by real time measurements; (4) using the WGS84 latitude and longitude coordinates for the measured control marks and an interpolation algorithm (cubic spline, etc.), calculate the geoid-ellipsoid separation distance N for the geoid grid model; (5) apply the separation distance N to the measured ellipsoid height $H_{ell}$ in a direction normal to the ellipsoid to determine an approximate orthometric height $h_{geoid}=N+H_{ell}$ relative to the geoid surface; (6) Perform a coordinate transformation to determine a shift distance d along a local vertical axis, a tilt angle $\phi$ relative to a north-south axis and a tilt angle $\lambda$ relative to an east-west axis. The three quantities d, $\phi$ and $\lambda$ are determined using the known quantities $h_{geoid}$ and $h_{control}$ for at least three common locations where $h_{control}$ is known and $h_{geoid}$ is measured or otherwise determined. The WGS84 ellipsoid parameters used here may be replaced by ellipsoid parameters corresponding to the NAD27, WGS72, NAD83 models or to any other suitable geodetic survey model.

DESCRIPTION OF BEST MODE OF THE INVENTION

The invention incorporates a geoid model and a recalibration of a local plane in order to account for geoid undulations with (large) wavelengths varying over a substantial range. Used by itself, a geoid model without a plane recalibration is insufficient; this approach provides only an estimate of local elevation and is not tied to any physical observation or control in the survey region. In practice, a geoid model, used alone, will not match local control measurements to better than ±10 cm. For example, a 80×80 km² control network of first-order benchmarks was measured using Real Time Kinematic GPS techniques, geoid ellipsoid separations were combined with GPS derived height above the ellipsoid and the resulting elevation estimates were compared to the known elevations.

Figure 1:
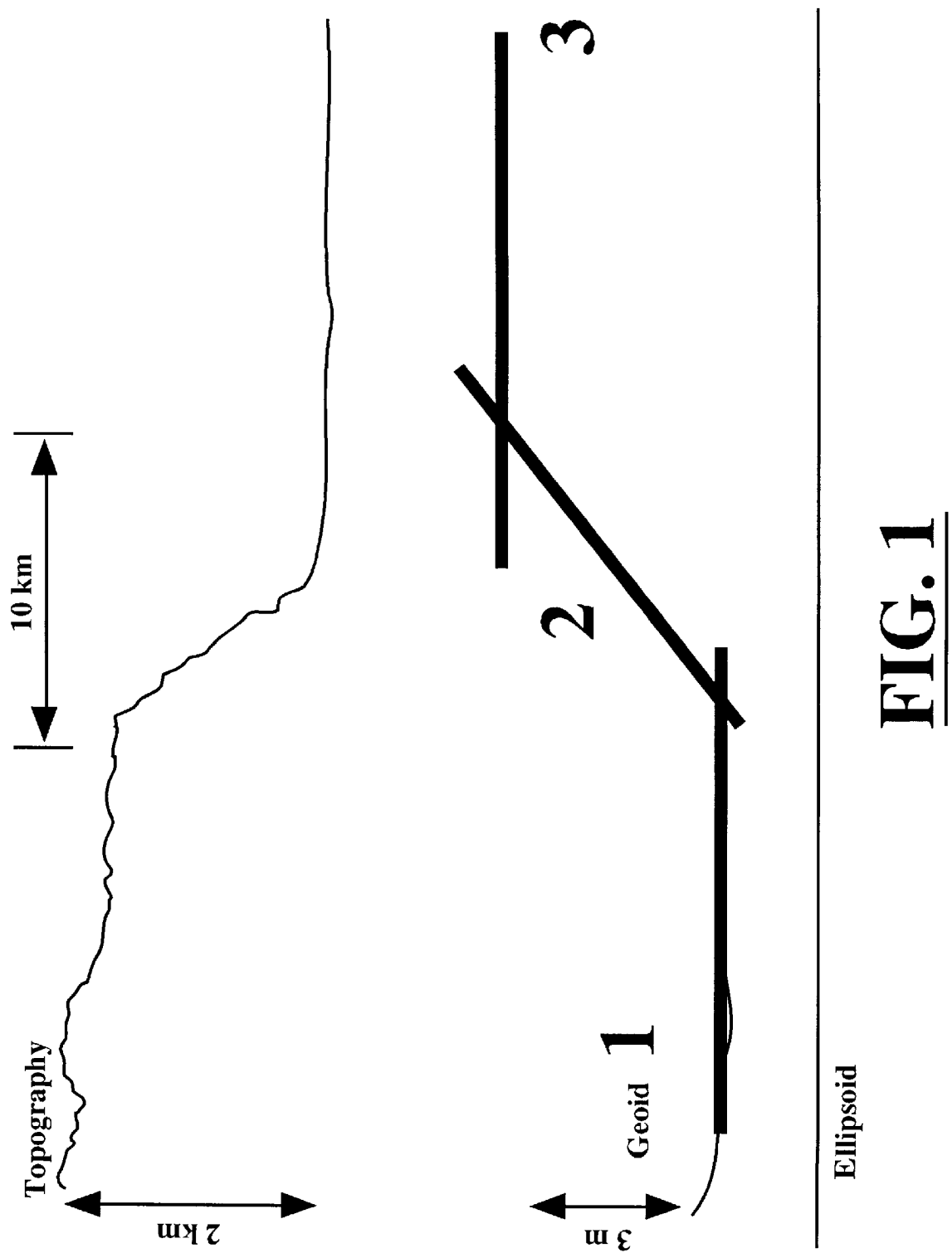
FIG. 1 is an example schematically illustrating how a geoid surface can vary locally in the presence of undulating topography.
Figure 2:
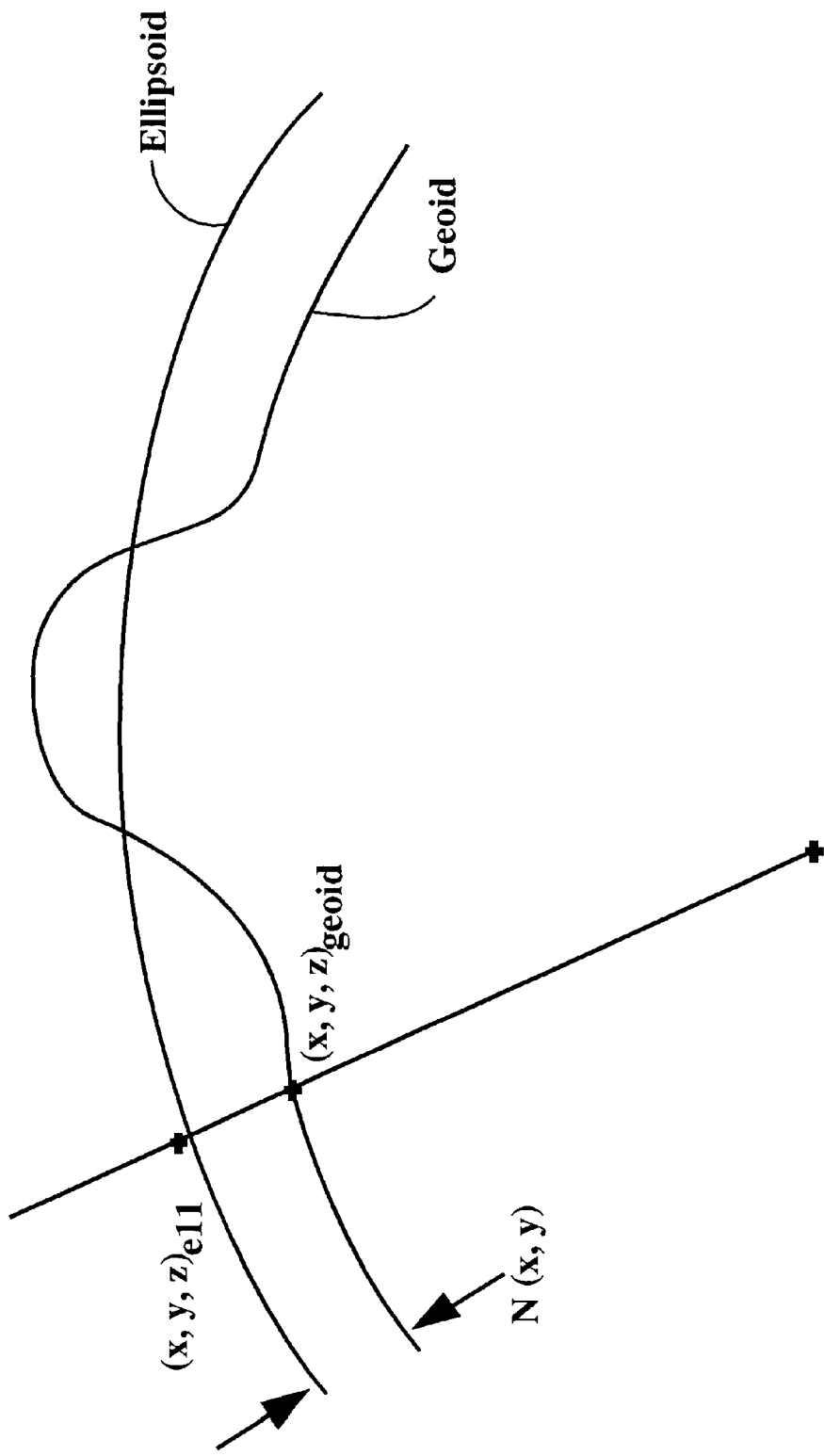
FIG. 2 illustrates a typical local relationship between a geoid and an ellipsoid used for a datum.

FIG. 2 illustrates a typical relationship between a geoid and a selected ellipsoid, such as WGS84, in a local region. A point on the ellipsoid, with coordinates $(x,Y,z)_{h_{ell}}$, and a corresponding point on the geoid, with coordinates $(x,y,z)_{geoid}$, have a separation distance $N(x,y)$ that may be positive (if $z_{ell}$ is greater than $z_{geoid}$), may be negative (if $Z_{ell}$ is less than $z_{geoid}$), or may be zero at a particular location.

Figure 3:
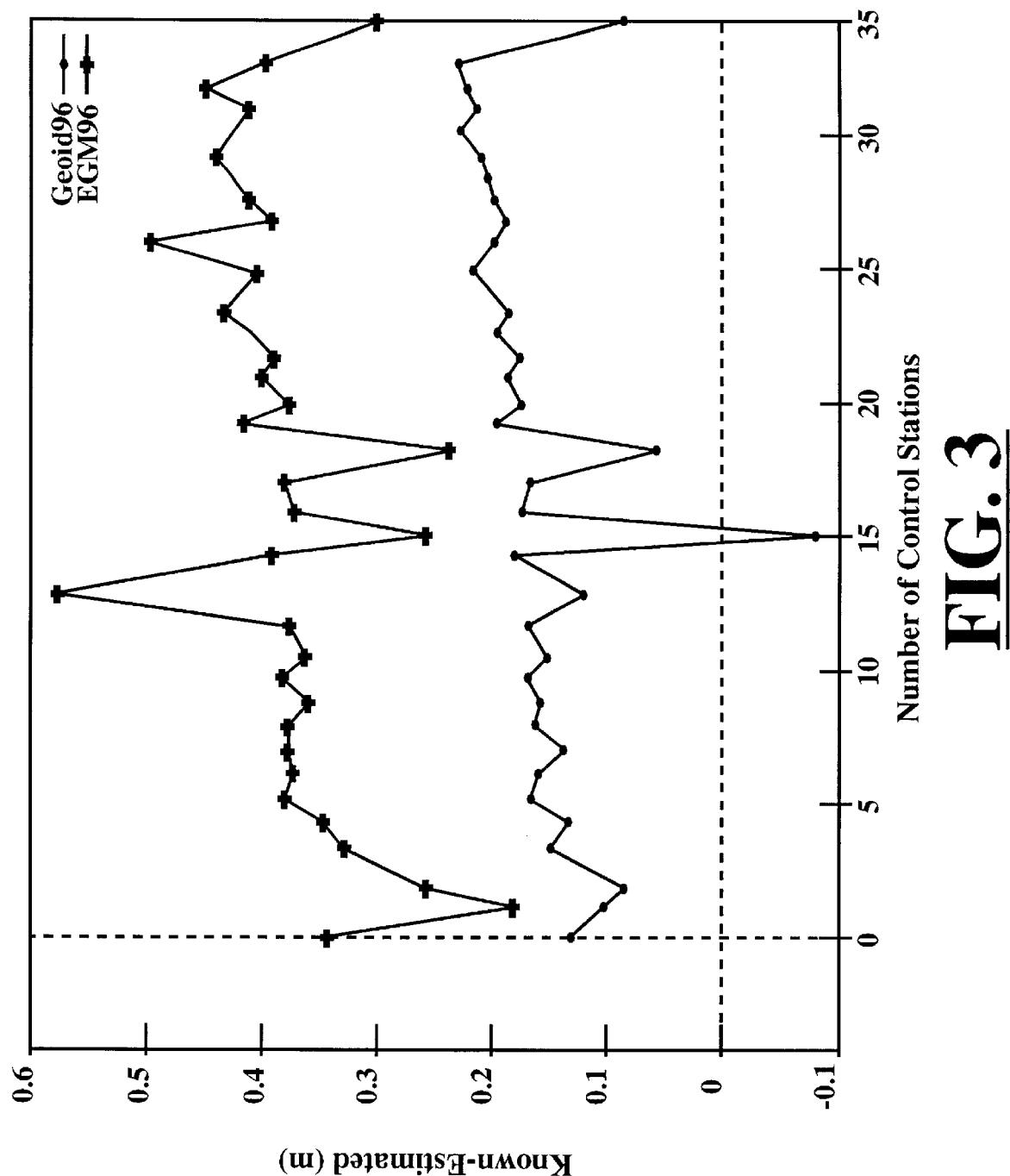
FIG. 3 is a graph of computed elevation using two different geoid models and measured WGS84 heights above the ellipsoid, compared to known elevations for the same points. This graph illustrates the accuracy achieved by using only a geoid model, with no plane adjustment, to estimate orthometric height.

FIG. 3 graphically illustrates elevation inaccuracy versus the number of control stations used, using only a geoid model. The inaccuracy is determined by subtracting the known value of a control station elevation, $h_{control}$, from the station elevation estimated by adding the geoid-ellipsoid separation distance N to the measured height above the WGS84 ellipsoid, $$h_{GPS}=N+h_{geoid}, \quad (1)$$

where $h_{GPS}$ is measured relative to the selected ellipsoid. The lower curve in FIG. 3 represents this difference, based on the GEOID96 model from the National Geodetic Survey (NGS), a model of geoid-ellipsoid separation values determined on a 2-minute by 2-minute grid spacing in latitude and longitude. The average elevation difference is ±12 cm. The upper curve in FIG. 3 represents the results of an analogous calculation, with elevations estimated from the EGM96 global geoid model, which provides a 15-minute by 15-minute grid spacing in latitude and longitude. The average elevation difference for the upper curve is ±35 cm.

Two conclusions can be drawn from FIG. 3. First, as is well known from the literature, the quality and grid density of the geoid model will affect the overall accuracy of WGS84 derived elevations. Second, a geoid model, used alone, is insufficient to match local control elevation for survey grade accuracy in real time.

In real time applications, surveyors currently use a best fitting plane for the vertical adjustment. An example is U.S. Pat. No. 5,614,913, issued to Nichols et al, incorporated by reference herein. A height above the WGS84 ellipsoid is measured and converted to elevation in real time, by passing the measured coordinates through a user-defined coordinate transformation. As noted earlier, this approach is adequate for projects carried out in small regions where minimal geoid undulation is present. However, this approach is inadequate for large project regions or where geoid undulations are large.

Figure 4:
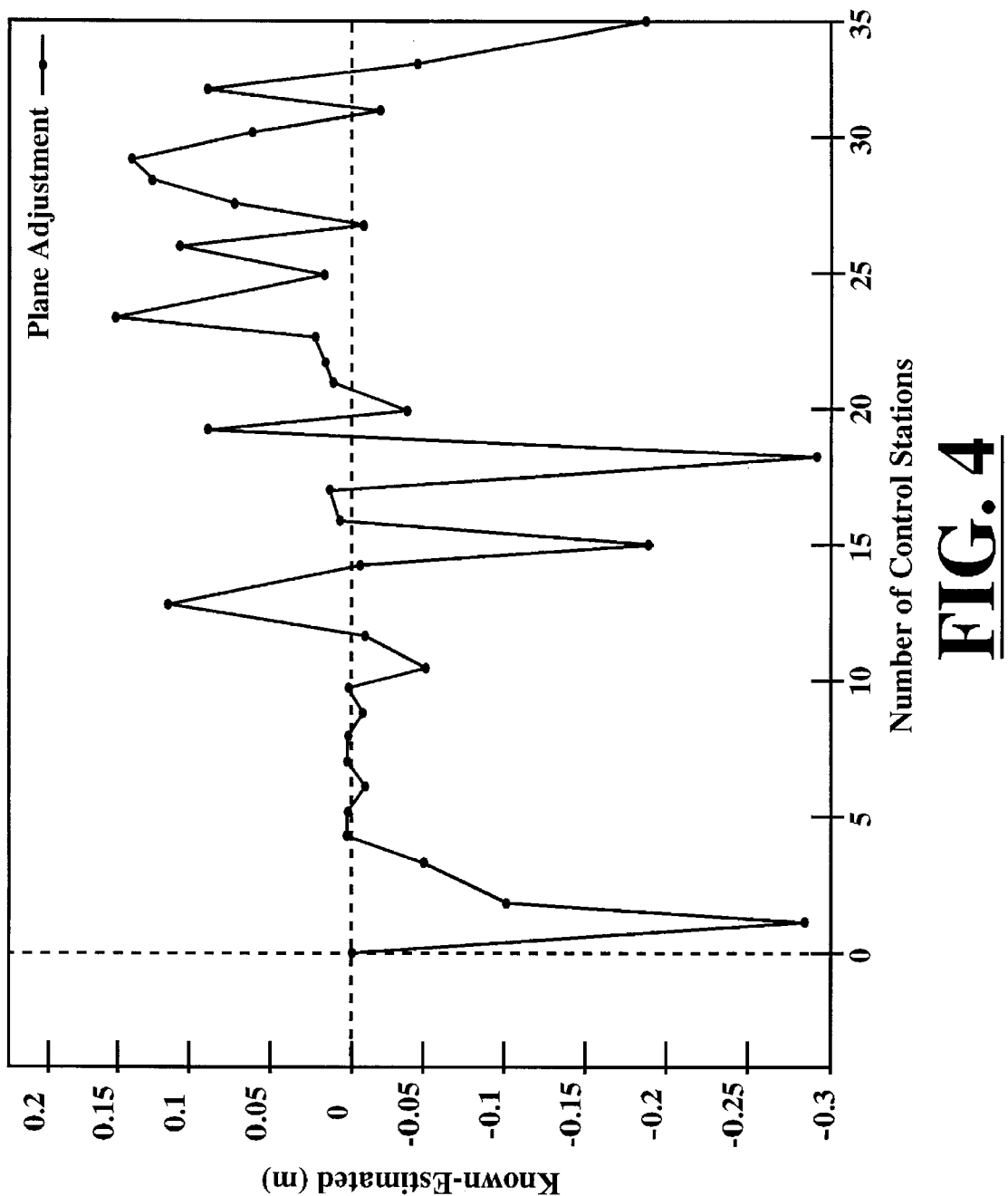
FIG. 4 is a graph showing the computed elevation inaccuracy using a simple vertical plane adjustment, with no geoid model included. Here, the adjustment parameters are calculated.

FIG. 4 graphically illustrates elevation inaccuracy, derived by fitting an optimum plane to heights measured relative to the WGS84 ellipsoid and known control station elevations, using only a plane adjustment. These inaccuracy values are calculated by subtracting known station elevation from elevations estimated by fitting an optimum (least squares) plane between measured WGS84 ellipsoid heights and known control elevations. For the project described in the preceding, a plane adjustment, used alone as in FIG. 4, results in an average absolute difference from the known control coordinate of 6.9 cm, with some discrepancies being as large as 20–30 cm.

Figure 5:
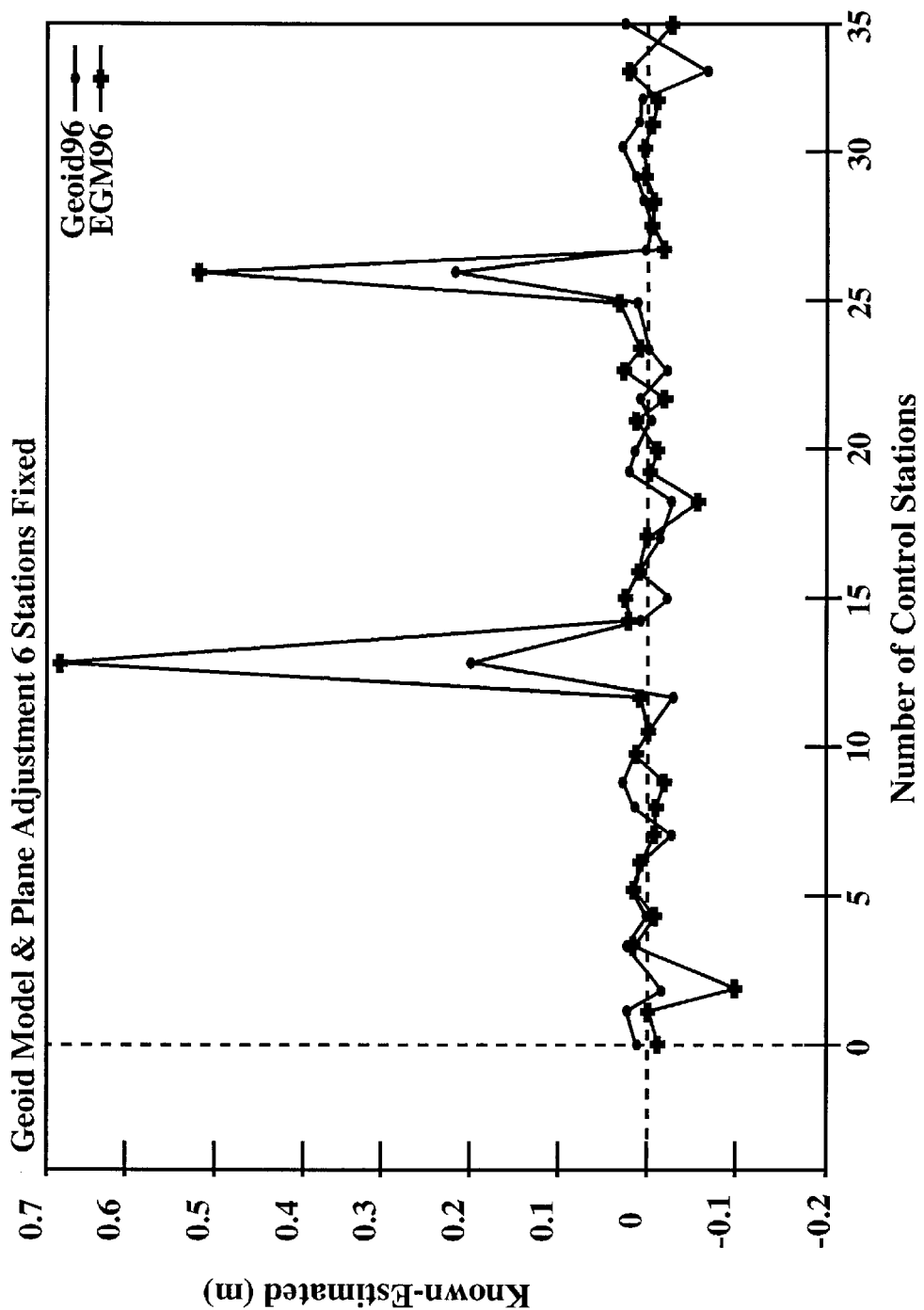
FIG. 5 is a graph showing the computed elevation inaccuracy using a combined vertic a plane adjustment and a geoid model.

FIG. 5 graphically illustrates elevation inaccuracy between the known elevation(s), estimated using a vertical plane adjustment, as in FIG. 4, combined with a geoid model. For the GEOID96 model, the magnitude of the average difference between the known and calculated coordinates is reduced to 1.6 cm. For the EGM96 model, the magnitude of the average difference is reduced to 2.1 cm. The two statistical outlier values that appear at control station values 13 and 26 correspond to use of two locations well outside the defined region of local control locations. The residual values for these two points were no included in estimating the average residual/difference value.

Comparison of the results associated with FIGS. 3, 4 and 5 indicates that substantial improvement occurs when a geoid model is combined with a best fitting plane adjustment for the measured elevations.

A vertical transformation in the "forward" direction is defined as follows. (1) Upload a set of control location coordinates $\{h_{control,i}\}$, including previous elevation measurement benchmark values, into a field survey controller or other computer that is programmed to perform calculations needed to implement the invention. (2) Upload an available (published or user-defined) geoid grid file into the controller. (3) Enter the location coordinates, referenced to a selected ellipsoid, such as the WGS84, NAD27, WGS72 or NAD83 model, for the project control benchmark values, including the height coordinate $h_{GPS}$ relative to the ellipsoid; or derive the coordinates relative to the ellipsoid by real time measurements. (4) Using the ellipsoid latitude and longitude measurements for the measured control values and an interpolation algorithm (cubic, spline, etc.), calculate the geoid-ellipsoid separation distance N, using the grid model, for each of the chosen points. (5) Calculate an approximate orthometric height for each chosen point, using Eq. (1). (6) Determine best fitting parameters d, f, and l, in a least path power sense (preferably, p=2), for a coordinate transformation T(x,y,z), where d is a shift distance or offset along a selected vertical axis, f is a tilt angle measured relative to a selected north-south axis, and 1 is a tilt angle measured relative to a selected east-west axis. The three quantities d, f and l are determined using three or more control locations, where $h_{control}$ is known and $h_{geoid}$ is calculated as in steps (5).

After the transformation parameters are established, the system performs the following operations, in the field or in a post-processing mode, using the selected geoid model. (i) Each time a location is surveyed to determine location, the latitude and longitude values of the surveyed location are used in a geoid interpolation, and a geoidellipsoid separation distance N is returned for that location. (ii) The separation distance N is applied to produce an orthometric height $h_{geoid}$. (iii) A one-dimensional similarity transformation is applied to $h_{geoid}$ to convert values for the survey location coordinates relative to the local vertical control coordinates.

A reverse transformation, from a local control elevation value $h_{control}$ to a height relative to a WGS84 (or other) ellipsoid, is best performed is an iterative process, because the difference between the local height, $h_{local}$, and the WGS84 height, $h_{GPS}$, affects the resulting latitude and longitude values. Initially, the $h_{control}$ value is assumed to be equal to the height above the ellipsoid, $h_{local}$. The local geodetic coordinates for a point are transformed to WGS84 latitude, longitude and height above the ellipsoid, using a selected datum transformation. A value for the geoid-ellipsoid separation distance N is then calculated using the WGS84 latitude and longitude values and the selected geoid model. The calculated N value is then added to the value for $h_{local}$ to provide a new estimate for the local ellipsoid height. The process is repeated until the difference between $h_{local}$ for the preceding iteration and the present iteration is less than a selected threshold, which may be chosen in a range of 0.1–10 cm.

Note that in computations in the prior art, some, but not all, of the same steps are followed to define and apply a vertical transformation using local height above a WGS84 or other ellipsoid to obtain $h_{local}$ and $h_{GPS}$. The invention differs from the preceding approaches by using the height $h_{geoid}$ derived from WGS84 height $h_{GPS}$, a geoid-ellipsoid separation distance N, and a control value $h_{control}$ to define the transformation from $h_{GPS}$ to height above a local datum. To confirm the usefulness of incorporation of a geoid model according to the invention, WGS84 heights above the ellipsoid from a field survey were used together with selected control points to generate a one-dimensional transformation with geoid separation values added to the WGS84 ellipsoid heights. The results are set forth in Tables 1 and 2, which correspond to the results presented graphically in FIGS. 4 and 5, respectively.

Figure 6:
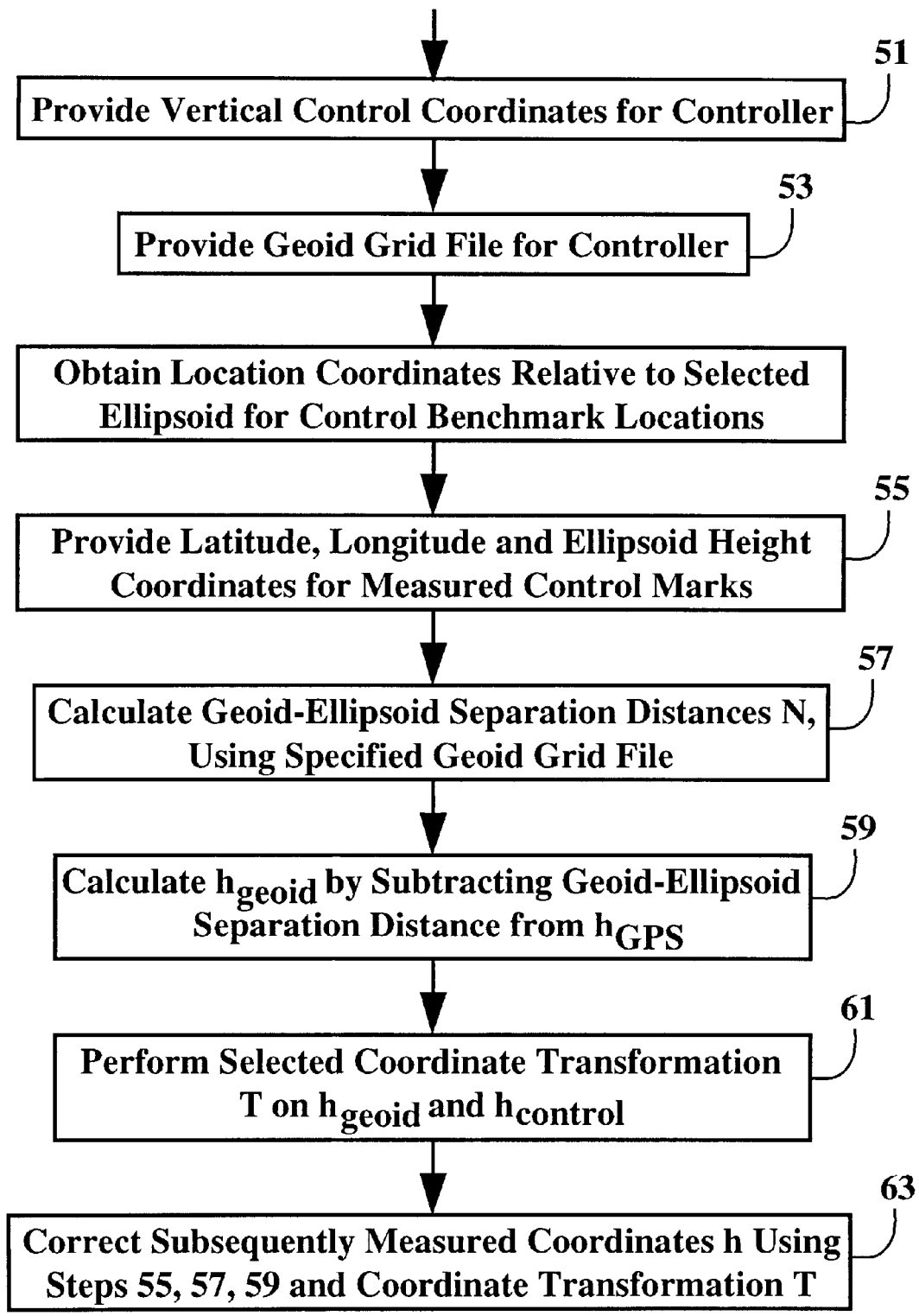
FIG. 6 is a flow chart illustrating steps to practice an embodiment of the invention.

FIG. 6 is a flow chart illustrating an embodiment of a method according to the invention. In step 51, a set of vertical control coordinates, including one or more previous elevation measurements $h_{control}$ for benchmarks, is uploaded into or otherwise provided for a field survey controller or other suitably programmed computer. In step 53, a published or user-defined geoid grid file (datum, etc.) is entered into the field controller. In step 55, WGS84 latitude, longitude and ellipsoid height coordinates for the measured control marks are entered or otherwise provided. In step 57, geoid-ellipsoid separation distances N are calculated using the geoid grid model from step 53. In step 59, the quantity $h_{geoid}$ is calculated by subtracting the geoid-ellipsoid separation distance N from $h_{GPS}$. In step 61, the system performs a coordinate transformation T(x,y,z)=(x',y',z') defined by $$\begin{bmatrix} x' \\ y' \\ z' \end{bmatrix} = \begin{bmatrix} \cos\lambda & \sin\lambda & 0 \\ -\sin\lambda & \cos\lambda & 0 \\ 0 & 0 & 1 \end{bmatrix} \begin{bmatrix} 1 & 0 & 0 \\ \cos\phi & \sin\phi & 0 \\ -\sin\phi & \cos\phi & 1 \end{bmatrix} \begin{bmatrix} x \\ y \\ z-d \end{bmatrix}, \quad (2)$$

where $\lambda$, $\phi$ and d were defined in the preceding. The three quantities $\lambda$, $\phi$ and d are determined using the known quantities $h_{geoid}$ and $h_{control}$ for at least three common locations for which $h_{control}$ is known and $h_{geoid}$ is measured or otherwise determined. In step 63, any subsequently measured height coordinate h is corrected to $h_{geoid}$, using the results of steps 55, 57 and 59, then passed through the coordinate transformation in Eq. (2), to determine a corrected h value.

In survey controllers that were previously disclosed, some of the same steps are followed to defme and apply a vertical transformation using local or WGS84 ellipsoid height $h_{GPS}$ and $h_{control}$. This model uses the height $h_{geoid}$, which is derived from WGS84 ellipsoid $h_{GPS}$ and geoid model, and $h_{control}$.

A mathematical model for the discrepancies between known control station elevations ($h_{control}$) and estimated elevation ($h_{geoid}=h_{GPS}-N$) is developed using the following equations.

$$h_{control}-(h_{GPS}-N)=dh-(N-N_0)d\alpha_N-(E-E_0)d\alpha_E, \quad (3)$$

or $$h_{control}-h_{geoid}=dh-(N-N_0)\,d\alpha_N-(E-E_0)d\alpha_E, \quad (4)$$

where $h_{control}-h_{geoid}$, $N-N_0$ and $E-E_0$ are M×1 column matrices representing measured separation distances and elevation differences, and the coefficients dh, $d\alpha_N$ and $d\alpha_E$ are unknown parameters that characterize the geoid model. Equation (5) is expressible in an expanded matrix format as $$\begin{bmatrix} 1 & (N-N_0)_1 & (E-E_0)_1 \\ 1 & (N-N_0)_2 & (E-E_0)_2 \\ 1 & (N-N_0)_3 & (E-E_0)_3 \\ & \dots & \\ 1 & (N-N_0)_1 & (E-E_0)_M \end{bmatrix} \begin{bmatrix} dh \\ -d\alpha_N \\ -d\alpha_E \end{bmatrix} = \begin{bmatrix} (h_{control} - h_{geoid})_1 \\ (h_{control} - h_{geoid})_2 \\ (h_{control} - h_{geoid})_3 \\ \\ (h_{control} - h_{geoid})_M \end{bmatrix} \quad (5)$$

The general form for Eq. (5) is $$AX = B, \quad (6)$$

where A is an M×3 matrix, X is a 3×1 column matrix of the unknowns, $dh$, $-d\alpha_N$ and $-d\alpha_E$, and B is an M×1 column matrix. If, as is usually the case, the number M of measurements is greater than 3, Eq. (6) is not formally solvable, but a solution of Eq. (6) can be obtained in a least squares sense, using a technique set forth by A. Gelb et al in *Applied Optimal Estimation*, M.I.T. Press, 1992, pp. 102–105. One seeks to minimize an error functional $$e = (B - AX^{\hat{}})^{tr} R \, (B - AX^{\hat{}}), \quad (7)$$

where R is a selected M×M positive definite weighting matrix. A least squares solution of Eq. (7) is $$X^{\hat{}} = (A^{tr} R \, A)^{-1} (A^{tr} R \, B), \quad (8)$$

where $A^{tr}$ is the transpose (3×M) of the matrix A. A stochastic model, including determination of optimal weights, can be formulated if desired, for example, by combining the estimated error in the GPS vertical observation with the root mean square error in the separation distance N and placing these values into a weighting coefficient matrix R (or $R^{-1}$). Alternatively, one can use uniform weighting, with R being the M×M identity matrix.

Where a geoid model is utilized, the controller performs the following operations. As each selected location is surveyed, using real time GPS analysis, the latitude and longitude of the location are passed through a geoid interpolation routine, and a geoid-ellipsoid separation N for that location is determined. The separation value N is applied to the surveyed height, based on the WGS84 (or other) ellipsoid, to obtain the value $h_{geoid}$ for that location, using Eq. (1). The location coordinate transformation set forth in Eq. (2) is then applied to determine the location height relative to the local vertical control. These operations require existence of a geoid model and are thus not disclosed in earlier work that does not provide or utilize a geoid model.

Figure 7:
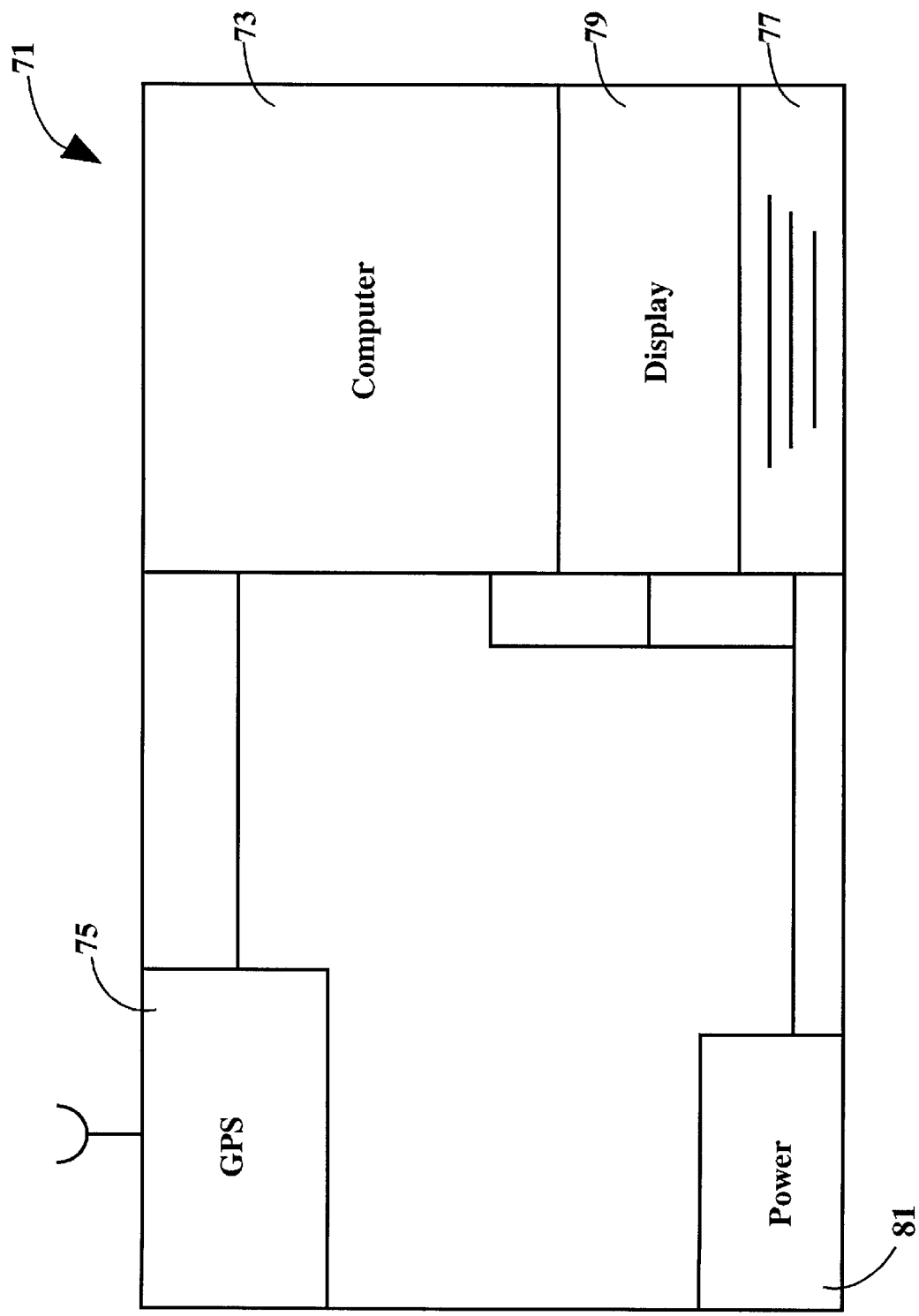
FIG. 7 schematically illustrates apparatus to practice the invention.

FIG. 7 schematically illustrates apparatus 71 suitable for practicing the invention. The apparatus includes a computer 73 that holds, or receives from elsewhere, control coordinates for selected known locations and that is programmed to perform the operations indicated in the flow chart in FIG. 6. Coordinates for one or more locations are determined using a GPS unit 75 including a GPS signal antenna and GPS receiver/processor, connected to the computer 73, to provide information on one or more locations that are not part of the control location group. The GPS receiver/processor may be part of the computer 73. Optionally, the apparatus also includes a keyboard or other data entry means 77 and a visual or audible display 79 connected to the computer 73. A power supply 81 provides power for the other components of the apparatus 71.

TABLE 1

| Point Name | Known | Plane 1 Calc | Plane 1 Resid | Plane 2 Calc | Plane 2 Resid | Plane 3 Calc | Plane 3 Resid | Plane 4 Calc | Plane 4 Resid | Plane 5 Calc | Plane 5 Resid | Plane 6 Calc | Plane 6 Resid |
|---|---|---|---|---|---|---|---|---|---|---|---|---|---|
| ALTO | 29.365 | 29.560 | −0.195 | 29.326 | 0.039 | 29.396 | −0.031 | 29.406 | −0.041 | 29.401 | −0.036 | 29.395 | −0.030 |
| B388 | 706.647 | 707.199 | −0.552 | 706.407 | 0.240 | 706.647 | 0.000 | 706.660 | −0.013 | 706.659 | −0.012 | 706.649 | −0.002 |
| BERT | 72.396 | 72.757 | −0.361 | 72.452 | −0.056 | 72.503 | −0.107 | 72.510 | −0.114 | 72.506 | −0.110 | 72.497 | −0.101 |
| BURL | 67.431 | 67.656 | −0.225 | 67.238 | 0.193 | 67.406 | 0.025 | 67.421 | 0.010 | 67.418 | 0.013 | 67.412 | 0.019 |
| CARMEN | 11.224 | 11.385 | −0.161 | 11.142 | 0.082 | 11.238 | −0.014 | 11.251 | −0.027 | 11.247 | −0.023 | 11.241 | −0.017 |
| CEMETARY | 48.500 | 48.658 | −0.158 | 48.325 | 0.175 | 48.462 | 0.038 | 48.477 | 0.023 | 48.473 | 0.027 | 48.468 | 0.032 |
| COLTER | 22.917 | 23.110 | −0.193 | 22.774 | 0.143 | 22.898 | 0.019 | 22.911 | 0.006 | 22.907 | 0.010 | 22.901 | 0.016 |
| COWBOY | 17.750 | 17.857 | −0.107 | 17.599 | 0.151 | 17.746 | 0.004 | 17.763 | −0.013 | 17.758 | −0.008 | 17.755 | −0.005 |
| E1242 | 18.727 | 18.900 | −0.173 | 18.638 | 0.089 | 18.732 | −0.005 | 18.744 | −0.017 | 18.740 | −0.013 | 18.734 | −0.007 |
| ELGRAN | 229.302 | 229.529 | −0.227 | 229.324 | −0.022 | 229.354 | −0.052 | 229.361 | −0.059 | 229.357 | −0.055 | 229.349 | −0.047 |
| F1239 | 19.134 | 19.279 | −0.145 | 18.978 | 0.156 | 19.108 | 0.026 | 19.123 | 0.011 | 19.119 | 0.015 | 19.114 | 0.020 |
| FRENCH | 42.438 | 42.705 | −0.267 | 42.404 | 0.034 | 42.483 | −0.045 | 42.492 | −0.054 | 42.488 | −0.050 | 42.481 | −0.043 |
| H1239 | 41.466 | 41.537 | −0.071 | 41.212 | 0.254 | 41.429 | 0.037 | 41.452 | 0.014 | 41.448 | 0.018 | 41.446 | 0.020 |
| HPGN0405 | 20.680 | 21.180 | −0.500 | 19.832 | 0.848 | 20.019 | 0.661 | 20.013 | 0.667 | 20.016 | 0.664 | 19.992 | 0.688 |
| JOHN | 41.632 | 41.775 | −0.143 | 41.439 | 0.193 | 41.597 | 0.035 | 41.613 | 0.019 | 41.609 | 0.023 | 41.605 | 0.027 |
| KCSM | 194.708 | 195.415 | −0.707 | 194.708 | 0.000 | 194.708 | 0.000 | 194.700 | 0.008 | 194.699 | 0.009 | 194.679 | 0.029 |
| KEHOE | 8.167 | 8.317 | −0.150 | 8.053 | 0.114 | 8.162 | 0.005 | 8.176 | −0.009 | 8.171 | −0.004 | 8.166 | 0.001 |
| KELLY | 12.320 | 12.443 | −0.123 | 12.187 | 0.133 | 12.311 | 0.009 | 12.326 | −0.006 | 12.322 | −0.002 | 12.318 | 0.002 |
| KING | 618.535 | 619.123 | −0.588 | 618.452 | 0.083 | 618.615 | −0.080 | 618.624 | −0.089 | 618.622 | −0.087 | 618.611 | −0.076 |
| MARINA | 6.224 | 6.295 | −0.071 | 6.166 | 0.058 | 6.216 | 0.008 | 6.227 | −0.003 | 6.222 | 0.002 | 6.217 | 0.007 |
| MELBA | 34.427 | 34.689 | −0.262 | 34.323 | 0.104 | 34.432 | −0.005 | 34.443 | −0.016 | 34.439 | −0.012 | 34.432 | −0.005 |
| MICHAEL | 18.524 | 18.655 | −0.131 | 18.366 | 0.158 | 18.501 | 0.023 | 18.516 | 0.008 | 18.512 | 0.012 | 18.507 | 0.017 |
| MIRAMAR | 8.084 | 8.234 | −0.150 | 8.031 | 0.053 | 8.102 | −0.018 | 8.113 | −0.029 | 8.108 | −0.024 | 8.103 | −0.019 |
| MOON2 | 22.260 | 22.297 | −0.037 | 22.038 | 0.222 | 22.215 | 0.045 | 22.234 | 0.026 | 22.230 | 0.030 | 22.228 | 0.032 |
| MOSS | 32.767 | 32.736 | 0.031 | 32.724 | 0.043 | 32.754 | 0.013 | 32.766 | 0.001 | 32.761 | 0.006 | 32.757 | 0.010 |
| N245 | 28.739 | 28.836 | −0.097 | 28.518 | 0.221 | 28.683 | 0.056 | 28.701 | 0.038 | 28.697 | 0.042 | 28.693 | 0.046 |
| NWRM | 7.536 | 8.014 | −0.478 | 6.957 | 0.579 | 7.045 | 0.491 | 7.037 | 0.499 | 7.038 | 0.498 | 7.015 | 0.521 |
| P245 | 13.894 | 14.075 | −0.181 | 13.796 | 0.098 | 13.900 | −0.006 | 13.913 | −0.019 | 13.909 | −0.015 | 13.903 | −0.009 |
| PRINCE | 13.843 | 13.924 | −0.081 | 13.824 | 0.019 | 13.862 | −0.019 | 13.873 | −0.030 | 13.867 | −0.024 | 13.862 | −0.019 |
| R1240 | 20.814 | 20.831 | −0.017 | 20.812 | 0.002 | 20.822 | −0.008 | 20.832 | −0.018 | 20.826 | −0.012 | 20.821 | −0.007 |
| S1240 | 18.565 | 18.565 | 0.000 | 18.565 | 0.000 | 18.565 | 0.000 | 18.574 | −0.009 | 18.569 | −0.004 | 18.564 | 0.001 |

TABLE 1-continued

| Point Name | Known | Plane 1 Calc | Plane 1 Resid | Plane 2 Calc | Plane 2 Resid | Plane 3 Calc | Plane 3 Resid | Plane 4 Calc | Plane 4 Resid | Plane 5 Calc | Plane 5 Resid | Plane 6 Calc | Plane 6 Resid |
|---|---|---|---|---|---|---|---|---|---|---|---|---|---|
| SANTI | 19.963 | 20.109 | −0.146 | 19.913 | 0.050 | 19.971 | −0.008 | 19.982 | −0.019 | 19.977 | −0.014 | 19.971 | −0.008 |
| SILVER | 34.007 | 34.232 | −0.225 | 33.915 | 0.092 | 34.021 | −0.014 | 34.032 | −0.025 | 34.028 | −0.021 | 34.022 | −0.015 |
| TIDALS | 4.335 | 4.410 | −0.075 | 4.303 | 0.032 | 4.353 | −0.018 | 4.364 | −0.029 | 4.359 | −0.024 | 4.354 | −0.019 |
| TUNITAS | 74.878 | 74.884 | −0.006 | 74.472 | 0.406 | 74.819 | 0.059 | 74.852 | 0.026 | 74.848 | 0.030 | 74.852 | 0.026 |
| V386 | 266.226 | 266.772 | −0.546 | 266.204 | 0.022 | 266.280 | −0.054 | 266.282 | −0.056 | 266.280 | −0.054 | 266.267 | −0.041 |
|  |  | SSR | 0.047 | SSR | 0.038 | SSR | 0.024 | SSR | 0.025 | SSR | 0.024 | SSR | 0.025 |

TABLE 2

| Point Name | Known | Geoid & Plane e1 Calc | Geoid & Plane e1 Resid | Geoid & Plane e2 Calc | Geoid & Plane e2 Resid | Geoid & Plane e3 Calc | Geoid & Plane e3 Resid | Geoid & Plane e4 Calc | Geoid & Plane e4 Resid | Geoid & Plane e5 Calc | Geoid & Plane e5 Resid | Geoid & Plane e6 Calc | Geoid & Plane e6 Resid |
|---|---|---|---|---|---|---|---|---|---|---|---|---|---|
| ALTO | 29.365 | 29.380 | −0.015 | 29.304 | 0.061 | 29.365 | 0.000 | 29.339 | 0.026 | 29.346 | 0.019 | 29.348 | 0.017 |
| B388 | 706.647 | 706.695 | −0.04 | 706.437 | 0.210 | 706.647 | 0.00 | 706.614 | 0.033 | 706.616 | 0.03 | 706.620 | 0.027 |
| BERT | 72.396 | 72.471 | −0.07 | 72.372 | 0.024 | 72.417 | −0.021 | 72.400 | −0.004 | 72.405 | 0.00 | 72.409 | −0.013 |
| BURL | 67.431 | 67.427 | 0.00 | 67.291 | 0.140 | 67.438 | −0.00 | 67.399 | 0.032 | 67.404 | 0.02 | 67.407 | 0.024 |
| CARMEN | 11.224 | 11.245 | −0.021 | 11.166 | 0.058 | 11.251 | −0.02 | 11.219 | 0.005 | 11.225 | −0.00 | 11.228 | −0.004 |
| CEMETARY | 48.SOO | 48.487 | 0.01 | 48.378 | 0.122 | 48.498 | 0.00 | 48.462 | 0.038 | 45.468 | 0.03 | 48.470 | 0.030 |
| COLTER | 22.917 | 22.916 | 0.001 | 22.806 | 0.111 | 22.914 | 0.00 | 22.882 | 0.035 | 22.888 | 0.02 | 22.890 | 0.027 |
| COWBOY | 17.750 | 17.779 | −0.02 | 17.695 | 0.055 | 17.823 | −0.07 | 17.780 | −0.030 | 17.786 | −0.03 | 17.788 | −0.038 |
| E1242 | 18.727 | 18.736 | −0.00 | 18.650 | 0.077 | 18.733 | −0.00 | 18.703 | 0.024 | 18.709 | 0.01 | 18.711 | 0.016 |
| ELGRAN | 229.302 | 229.312 | −0.01 | 229.246 | 0.056 | 229.272 | 0.03 | 229.254 | 0.048 | 229.260 | 0.04 | 229.264 | 0.038 |
| F1239 | 19.134 | 19.132 | 0.00 | 19.034 | 0.100 | 19.148 | −0.01 | 19.111 | 0.023 | 19.117 | 0.01 | 19.119 | 0.015 |
| FRENCH | 42.438 | 42.470 | −0.03 | 42.371 | 0.067 | 42.440 | −0.00 | 42.417 | 0.021 | 42.422 | 0.01 | 42.426 | 0.012 |
| H1239 | 41.466 | 41.474 | −0.00 | 41.368 | 0.098 | 41.558 | −0.09 | 41.502 | −0.036 | 41.508 | −0.04 | 41.508 | −0.042 |
| HPGN0405 | 20.680 | 20.741 | −0.061 | 20.302 | 0.378 | 20.465 | 0.21 | 20.479 | 0.201 | 20.476 | 0.20 | 20.486 | 0.194 |
| JOHN | 41.632 | 41.625 | 0.00 | 41.516 | 0.116 | 41.654 | −0.02 | 41.613 | 0.019 | 41.619 | 0.01 | 41.620 | 0.012 |
| KCSM | 194.708 | 194.938 | −0.23 | 194.708 | 0.000 | 194.708 | 0.00 | 194.728 | −0.020 | 194.730 | −0.02 | 194.738 | −0.030 |
| KEHOE | 8.167 | 8.177 | −0.01 | 8.090 | 0.077 | 8.186 | −0.01 | 8.153 | 0.014 | 8.159 | 0.00 | 8.161 | 0.006 |
| KELLY | 12.320 | 12.335 | −0.01 | 12.251 | 0.069 | 12.360 | −0.04 | 12.323 | −0.003 | 12.329 | −0.00 | 12.331 | −0.011 |
| KING | 618.535 | 618.643 | −0.10 | 618.424 | 0.111 | 618.567 | −0.03 | 618.54 | −0.010 | 618.548 | −0.01 | 618.553 | −0.018 |
| MARINA | 6.224 | 6.203 | 0.021 | 6.160 | 0.064 | 6.204 | 0.02 | 6.177 | 0.047 | 6.184 | 0.04 | 6.186 | 0.038 |
| MELBA | 34.427 | 34.442 | −0.01 | 34.323 | 0.104 | 34.418 | 0.00 | 34.391 | 0.036 | 34.396 | 0.031 | 34.399 | 0.028 |
| MICHAEL | 18.524 | 18.527 | −0.003 | 18.433 | 0.091 | 18.551 | −0.02 | 18.513 | 0.011 | 18.519 | 0.00 | 18.521 | 0.003 |
| MIRAMAR | 8.084 | 8.090 | −0.00 | 8.024 | 0.060 | 8.086 | −0.00 | 8.058 | 0.026 | 8.064 | 0.02 | 8.067 | 0.017 |
| MOON2 | 22.260 | 22.253 | 0.00 | 22.169 | 0.091 | 22.323 | 0.06 | 22.273 | −0.013 | 22.280 | −0.02 | 22.280 | −0.020 |
| MOSS | 32.767 | 32.765 | 0.00 | 32.761 | 0.006 | 32.788 | −0.021 | 32.758 | 0.009 | 32.766 | 0.001 | 32.768 | −0.001 |
| N245 | 28.739 | 28.715 | 0.02 | 28.611 | 0.128 | 28.756 | −0.01 | 28.712 | 0.027 | 28.718 | 0.021 | 28.720 | 0.019 |
| NWRM | 7.536 | 7.538. | −0.00 | 7.193 | 0.343 | 7.270 | 0.26 | 7.291 | 0.245 | 7.290 | 0.24 | 7.299 | 0.237 |
| P245 | 13.894 | 13.911 | −0.01 | 13.820 | 0.074 | 13.911 | −0.01 | 13.880 | 0.014 | 13.886 | 0.00 | 13.588 | 0.006 |
| PRINCE | 13.843 | 13.850 | −0.00 | 13.818 | 0.025 | 13.851 | −0.00 | 13.824 | 0.019 | 13.832 | 0.01 | 13.834 | 0.009 |
| R1240 | 20.814 | 20.818 | −0.00 | 20.812 | 0.002 | 20.821 | −0.00 | 20.796 | 0.018 | 20.805 | 0.00 | 20.807 | 0.007 |
| S1240 | 18.565 | 18.565 | 0.00 | 18.565 | 0.000 | 18.565 | 0.00 | 18.542 | 0.023 | 18.550 | 0.01 | 18.552 | 0.013 |
| SANTI | 19.963 | 19.952 | 0.011 | 19.888 | 0.075 | 19.939 | 0.02 | 19.914 | 0.049 | 19.921 | 0.04 | 19.923 | 0.040 |
| SILVER | 34.007 | 34.030 | −0.02 | 33.927 | 0.080 | 34.020 | −0.01 | 33.990 | 0.017 | 33.996 | 0.01 | 33.999 | 0.008 |
| TIDALS | 4.335 | 4.346 | −0.011 | 4.311 | 0.024 | 4.354 | −0.01 | 4.326 | 0.009 | 4.333 | 0.00 | 4.335 | 0.000 |
| TUNITAS | 74.878 | 74.885 | −0.00 | 74.751 | 0.127 | 75.054 | −0.17 | 74.972 | −0.094 | 74.978 | −0.10 | 74.976 | −0.098 |
| V386 | 266226 | 266.325 | −0.09 | 266.140 | 0.086 | 266.206 | 0.02 | 266.200 | 0.026 | 266.203 | 0.02 | 266.209 | 0.017 |
|  |  | SSR | 0.035 | SSR | 0.021 | SSR | 0.012 | SSR | 0.010 | SSR | 0.010 | SSR | 0.010 |

We claim:

1. A method for enhancing the accuracy of survey location coordinates, the method comprising the steps of:

receiving a set of known location coordinates for at least three selected known survey locations;

receiving a sequence of location coordinates representing a grid of locations that are part of a selected geoid that represents a selected region on or near the Earth's surface, where each of at least three selected geoid locations coincides with one of the at least three known survey locations;

receiving location coordinates for each of a selected group of survey control locations, referenced to a selected local datum;

estimating the location coordinates, relative to the local datum, of each of the at least three selected geoid locations;

determining a separation distance between each of the at least three selected geoid locations and the local datum;

determining a location coordinate transformation of the geoid onto at least a portion of the local datum, where each of the at least three selected geoid locations is transformed into a corresponding one of the at least three known survey locations; and applying the location coordinate transformation to location coordinates for at least one selected survey location that is not one of the at least three selected geoid locations.

2. The method of claim 1, further comprising the step of choosing said selected local datum from a group of ellipsoids consisting of an NAD27 ellipsoid, a WGS72 ellipsoid, an NAD83 ellipsoid and a WGS84 ellipsoid.

3. The method of claim 1, wherein said step of applying said location coordinate transformation for said at least one selected survey location that is not one of said selected geoid locations comprises the steps of:

determining said location coordinates of said at least one selected location using GPS signals received at said at least one selected survey location; and using information contained in the GPS signals to determine said location coordinates of said at least one selected survey location.

4. Apparatus for enhancing the accuracy of survey location coordinates, the apparatus comprising a computer that is programmed:

to receive a set of known location coordinates for at least three selected survey locations;

to receive a sequence of location coordinates representing a grid of locations that are part of a selected geoid that represents a selected region on or near the Earth's surface, where each of the at least three selected geoid locations coincides with one of the at least three known survey locations;

to receive location coordinates for each of a selected group of survey control locations, referenced to a selected local datum;

to estimate the location coordinates for each of the at least three selected geoid locations;

to determine a separation distance between each of the at least three selected geoid locations and the local datum;

to determine a location coordinate transformation of the geoid onto at least a portion of the local datum, where each of the at least three selected geoid locations is transformed into a corresponding one of the at least three known survey locations; and to apply the location coordinate transformation to location coordinates for at least one selected survey location that is not one of the at least three selected geoid locations.

5. The apparatus of claim 4, wherein said selected local datum is chosen from a group of ellipsoids consisting of an NAD27 ellipsoid, a WGS72 ellipsoid, an NAD83 ellipsoid and a WGS84 ellipsoid.

6. The apparatus of claim 4, further comprising a GPS signal antenna and GPS signal receiver/processor, communicating with said computer, that receive GPS signals and determine said location coordinates for said at least one selected survey location that is not one of said at least three selected geoid locations.

7. The apparatus of claim 4, wherein said computer is further programmed to apply said location coordinate transformation for said at least one selected survey location that is not one of said selected geoid locations by:

determining said location coordinates of said at least one selected location using GPS signals received at said at least one selected survey location; and using information contained in the GPS signals to determine said location coordinates of said at least one selected survey location.

* * * * *